May 15, 1962

R. B. HAMMETT 3,034,299

APPARATUS AND METHOD FOR EFFECTING A WAVE
INTERMEDIARY THERMODYNAMIC CYCLE

Filed May 2, 1960

INVENTOR
ROBERT B. HAMMETT

BY Cushman, Darby & Cushman

ATTORNEYS

May 15, 1962 R. B. HAMMETT 3,034,299
APPARATUS AND METHOD FOR EFFECTING A WAVE
INTERMEDIARY THERMODYNAMIC CYCLE
Filed May 2, 1960 2 Sheets-Sheet 2

INVENTOR
ROBERT B. HAMMETT

BY Cushman Darby & Cushman
ATTORNEYS

United States Patent Office 3,034,299
Patented May 15, 1962

3,034,299
APPARATUS AND METHOD FOR EFFECTING A WAVE INTERMEDIARY THERMODYNAMIC CYCLE
Robert B. Hammett, % Whitney Bldg., New Orleans, La.
Filed May 2, 1960, Ser. No. 26,311
19 Claims. (Cl. 60—39.77)

The present invention relates to an apparatus and method for effecting a novel thermodynamic cycle in conjunction with a resonator chamber having a standing wave in an elastic fluid medium disposed therein, wherein an inlet valve and a discharge valve associated with the chamber are so located and timed with respect to the standing wave, that the characteristics of the wave are utilized to effect the passage of fluid through the chamber, and that simultaneously therewith the expansion process associated with one of the valves is utilized to enhance the wave energy of the standing wave. There is also provision for extracting useful energy from the cycle.

Generally speaking, the present invention is concerned with a thermodynamic cycle, the basic steps of which comprise the intake, compression, expansion, and discharge of a fluid. The term "thermodynamic cycle" as used herein and as often applied to similar processes, refers to the passage of a fluid through a series of thermodynamic processes such as compression, heating, and expansion in which this fluid is returned to a state approaching its initial state, but not identical to it as the strict interpretation of this term requires. Unlike the cycles in conventional piston and turbine machines, however, the present invention provides for the return of useful energy derived from the expansion process to the compression process by means of fluid propagated wave energy. Since the present invention is capable of being embodied in a machine having efficiencies comparable to or higher than those of piston and turbine machines, it is contemplated that machines embodying the principles of the present invention may serve as practical replacements for such machines in many applications, such as, for example, heat pumps, heat engines, gas generators, and apparatus for the conversion of a fluid flow at a particular pressure and volume state into a fluid flow at a different pressure and volume state.

Presently existing resonant wave engines all have one serious limitation in common, namely that they are severely limited in the optimum efficiencies which they may obtain. This is true simply because of the particular manner in which they utilize the work which they generate. The conventional resonant wave engine is generally characterized by the provision of a resonant chamber having both an inlet port or valve and means for causing internal combustion, at one end, and at the other end being either open or provided with a discharge port or valve, the mean pressure within the chamber always being positive with respect to the inlet pressure. In some engines, as where a half wave length section is used, a discharge port may be alternately provided intermediate the ends of the chamber. In operation, intermittent pressure pulses are created at the inlet end of the chamber by the internal combustion of conventional fuel-air mixtures, and these pulses travel the length of the chamber where, upon reaching the opposite end, they are reflected back toward the inlet end. If no fluid was discharged from the system each cycle of operation, the pressure pulse or standing wave thus reflected back up the chamber, would assist in the compression process of the next cycle of operation.

As will be appreciated, the greater the proportion of the total wave energy created by the combustion process which is returned to the compression process, the greater will be the compression pressures which may be achieved, and therefore the obtainable efficiencies. In presently existing resonant wave engines, however, only a very small proportion of the total wave energy generated in the system by combustion is returned to the compression process, and therefore higher efficiencies are not possible since the compression process is not sufficiently augmented by the wave energy. This is further true because a portion of the energy created by combustion must be used to initiate the wave each cycle of operation. This disadvantage of existing engines is due to the fact that in actual practice they discharge fluid from the system in such a way as all but kill the wave on each cycle; namely, by discharging fluid from the resonant chamber when the fluid wave pressure at the point of discharge is equal to at least the mean pressure of the wave within the chamber, and in some cases even a higher pressure.

As will be understood by those familiar with the sound art, the wave energy in any given standing wave is primarily in the form of potential energy at the pressure antinodes (zones of maximum pressure variation), due to the existence of fluid thereat at maximum pressure excursions in both the positive and negative directions with respect to the mean pressure of the wave. At the velocity antinodes or pressure nodes (zones of minimum pressure variation and maximum velocity variation), the wave energy is in the form of kinetic energy of the fluid particles moving at high velocity, the wave energy at any intermediate position or zone consisting of a combination of these energies. At a pressure antinode, therefore, the total wave energy is represented by the difference between the maximum pressure and the minimum pressure of the wave at that point, these extreme pressures occurring at the same point at times one-half cycle apart. Existing engines rob the cycle of most of this energy by either opening a discharge valve at a pressure antinode when the pressure thereat is maximum, in which case all of the wave energy is lost, or by discharging at a velocity antinode at the mean pressure of the wave, in which case at least half of the wave energy is taken from the cycle. In both cases, insufficient wave energy remains in the cycle to be of much assistance to the compression process. Significantly high efficiencies are therefore not possible because high compression pressures are not obtainable.

As can thus be seen, previous resonant wave machines are inherently limited in the maximum efficiencies which may be achieved primarily because of the fact that the discharge processes utilized actually remove wave energy from the system. In addition, it should be noted that the inletting processes utilized similarly serve to decrease the wave energy in the various systems. This results from the fact that the inlet fluid is generally introduced into the system at a place where and time when the pressure of the wave is at a minimum, inlet flow occurring because the pressure of the inlet fluid is greater than this minimum pressure of the wave. The net result, accordingly, is that the pressure within the system at this time and place is increased in a direction toward the mean pressure of the system, thus reducing the wave energy previously existing due to the relatively large negative pressure excursion.

It is therefore a primary object of the present invention to provide a resonant wave apparatus for performing useful work, wherein the discharge process, or alternately the intaking process, is utilized to actually increase the wave energy within the system. A related object is the provision of a method of achieving a novel thermodynamic cycle in which an expansion process is utilized to effect a flow of fluid through the operating system, and in addition, to effect an increase in the wave energy therein to be available for the compression process.

Another object of the present invention is the provision of an apparatus and method for effecting a novel thermodynamic cycle to be operated in conjunction with a resonator chamber having a standing wave in an elastic fluid medium disposed therein, wherein an inlet valve and a discharge valve are associated with the chamber and are so located and timed with respect to the standing wave, that firstly the characteristics of said wave are utilized to effect the passage of fluid through said chamber, and secondly that simultaneously therewith the expansion process associated with one of the valves is utilized to increase or enhance the wave energy of the standing wave.

It is a further object of the present invention to provide a novel resonant wave apparatus, and a method of operation therefor, adapted to be operated at either a positive or negative mean pressure, with respect to the inlet pressure, wherein the inlet and discharge valves are so located and timed with respect to the standing wave that the flow of fluid through the apparatus will actually increase the wave energy of the standing wave.

It is a further object of the present invention to provide an apparatus capable of operation as an internal combustion resonant wave engine, and a method of operation therefor, wherein wave energy available for the compression process is actually increased by the method in which the exhaust or discharge of fluid from the system is accomplished, and wherein the high mean pressure necessary for an efficient wave mechanism is maintained.

It is yet a further object of the present invention to provide a novel resonant wave apparatus, and a method of operation therefor, adapted to be operated at a positive mean pressure with respect to the inlet pressure, wherein the discharge of fluid from the apparatus is utilized to actually increase the wave energy within the system.

A still further object of the present invention is the provision of a novel resonant wave apparatus, and a method of operation therefor, adapted to be operated at a negative mean pressure with respect to the inlet pressure, wherein the inletting of fluid into the apparatus is utilized to actually increase the wave energy within the system.

Another object of the present invention is the provision of a novel internal combustion resonant wave engine, and a method of operation therefor, wherein wave energy is utilized to obtain an efficient compression process, and wherein this wave energy is derived not only from the combustion process, but actually from an expansion of the combustion products when discharged from the engine.

These and other objects of the present invention will become apparent from consideration of the present specification taken in conjunction with the accompanying drawings in which there are shown several embodiments of the invention by way of example, and wherein.

Figure 1:
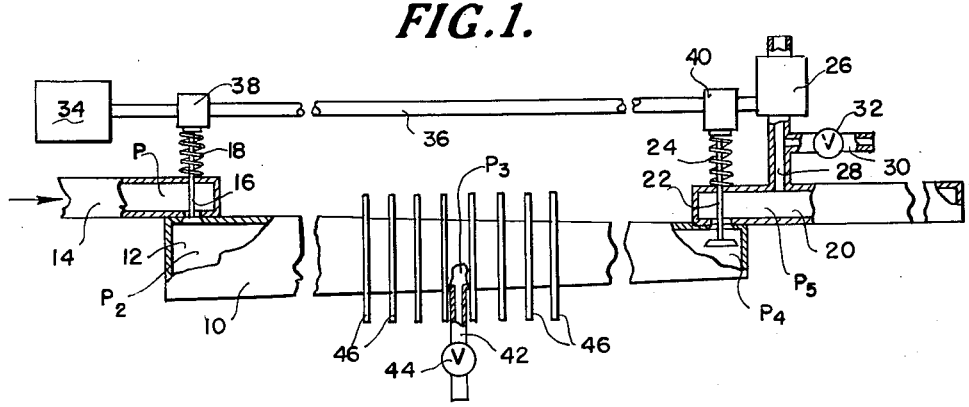
FIGURE 1 is a schematic illustration of one embodiment of the present invention.

Generally speaking, the present invention is readily capable of being embodied in many different types of apparatus, only several of which will be described herein for exemplary purposes. Considering the invention broadly, all of the embodiments comprise a housing defining a resonant chamber in which there is provided a standing wave in an elastic medium disposed therein. In order to facilitate the flow of fluid through the housing there is provided at least one inlet valve and at least one discharge valve. As will be more fully described hereinafter, the valves are located at such points on the housing with respect to the standing wave configuration therein, and are operated in such a timed relationship with the standing wave, that flow through the housing is achieved. In addition, the location and timing of the valves is such that there exists at at least one of the valves an expansion process which actually serves to increase the wave energy of the standing wave. This increasing or enhancement of the wave energy serves to significantly increase the efficiency of the overall system because of the fact that the energy within the wave itself may be utilized in the compression process. As is well known in the sound art, any standing wave comprises a series of consecutive compression and expansion processes, these compression processes being the ones referred to.

In order to obtain the higher efficiencies of which the present invention is capable, a greater proportion of the available energy in the system is left in the system to provide for an efficient compression process. The maximum useful work which may be derived from a resonant wave apparatus may be represented by the pressure differential between the peak combustion, or wave, pressure and some reference pressure, such as atmospheric, to which the fluid in the wave may be expanded. This is, of course, true regardless of whether or not internal combustion is used. As has been mentioned, conventional resonant wave engines remove most of this useful work from the system. However, in the present invention, only a small portion is removed from the system to perform useful work, the remainder being used to increase the efficiency of the system. Although it would appear that the net work output would thereby be less in an apparatus embodying the present invention than in a conventional apparatus, such is not true because of the greater efficiencies which may be obtained with this invention. In the present invention it is only the proportion of the output of the potentially available work which is less than in a conventional apparatus, and not the actual quantity of net useful work output which may be achieved.

The cycle of operation with which the present invention is concerned is characterized by certain pressure and flow conditions which must exist within the system for it to properly operate. These pressure and flow conditions are essential in order to provide for the flow of fluid through the operating system, and to provide for the enhancement of the wave energy within the system to obtain an efficient compression process. For present purposes, the term "system" is intended to include a standing wave in an elastic fluid medium disposed within any suitable resonant enclosure. In order to provide for the flow of inlet fluid into the system it is essential that inlet valve means be provided in the resonant enclosure adjacent a zone of substantial pressure variation of the fluid wave within the enclosure, and that at some time the pressure of the fluid in that zone be at a pressure less than the pressure of the inlet fluid before entering the enclosure so the valve may be opened to allow inlet flow. The pressure variations within the enclosure are, of course, primarily due to the standing wave. Similarly, the profile of the pressure variations within the enclosure along any dimensions are also dictated by the characteristics of the standing wave.

To provide for the discharge of fluid from the enclosure it is essential that discharge valve means be provided thereon adjacent a zone of substantial pressure variation which, at some time, will be at a pressure greater than the discharge pressure so that the discharge valve may be opened to allow discharge flow. By discharge pressure is meant the external pressure to which the fluid is discharged. As can be seen, these first two pressure and flow conditions facilitate the flow of fluid through the system, and each of them are characterized by an expansion process of a fluid from a higher pressure to a lower pressure. Any fluid, such as air, may be used.

A third necessary pressure condition requires that at least one of the valves be so timed and located with respect to the wave that it will operate to create an expansion process which will actually enhance or increase the wave energy within the system at that point. This enhancement of the wave is achieved by increasing the amplitude of the wave within the enclosure at the point where the valve is located. Because of this enhancement of the wave by the valving either into or out of the enclosure, the wave will be sustained and need not be initiated every cycle by any type of combustion process, and sufficient wave energy will remain in the system to facilitate a highly efficient compression process.

There are almost an infinite variety of types of apparatus in which the present invention may be embodied. However, since disclosure of all possible embodiments is impossible, there are described and illustrated herein only several embodiments for exemplary purposes, to illustrate several ways in which the present invention may be actually practiced for useful purposes. These embodiments clearly illustrate the principles of the present invention so they may be readily understood, and include positive mean pressure machines and systems, wherein the mean pressure of the wave is greater than the inlet pressure, negative mean pressure machines and systems, wherein the mean pressure is less than the inlet pressure, and closed cycles, wherein a positive mean pressure system operates in conjunction with a negative mean pressure system. In addition, there are set forth many possible modifications which may be made to the several exemplary embodiments disclosed.

Considering only positive mean pressure systems, the number of possible embodiments is still great. However, all positive mean pressure systems have in common the manner in which the wave energy in the system is increased or enhanced. In this type of system it is the expansion process at the discharge valve, to cause discharge flow, which is utilized to enhance the wave energy. In all the positive mean pressure embodiments this is achieved by discharging fluid from the system when the pressure of the wave at the discharge valve is at and about a point of extreme pressure excursion in the negative direction. Thus, the expansion through the discharge valve will serve to "stretch out" or increase the amplitude of the wave at that point, the result being that the potential energy of the wave at the point of discharge will be increased by the increase in the amplitude of the wave thereat. All positive mean pressure embodiments of this invention are also similar in that both the intaking and discharging of fluid occurs when the wave pressure at the valves is at and about an extreme excursion in the same direction, namely the negative direction.

Figure 2:
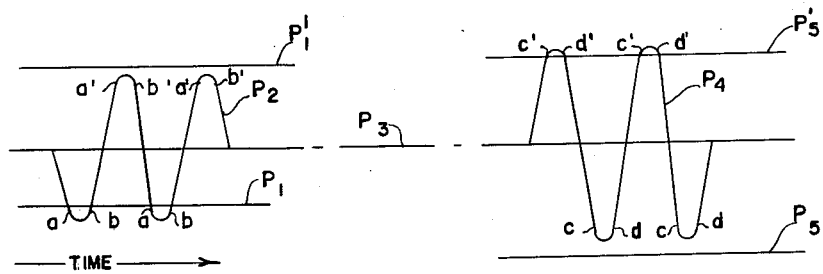
FIGURE 2 is a pressure-time curve diagrammatically illustrating the pressures within the apparatus shown in FIGURE 1 when it is operating.

In FIGURES 1 and 2 there is illustrated an exemplary embodiment of an apparatus, and the pressure-time diagram therefor, which may be operated as a positive mean pressure machine. This apparatus comprises a resonant housing 10 defining an elongated tapered resonant chamber 12 therein. At the left end of the housing 10 there is provided a suitable inlet manifold or chamber 14 and an inlet valve 16 of conventional design. The inlet valve 16 is held normally closed by means of valve spring 18. At the right-hand end of the housing 10 there is provided a discharge manifold or chamber 20 and a discharge valve 22, also of conventional design, and biased closed by a valve spring 24. To cause fluid to flow through the apparatus, when desired, there is provided a pump 26 connected by means of a fluid passageway 28 to discharge chamber 20. Fluid passageway 28 is also provided with a branching conduit 30 having a valve 32 therein. To drive pump 26 there is provided a motor 34 connected thereto by means of shaft 36, on which there are disposed cams 38 and 40 for driving valves 16 and 22 respectively.

Housing 10 may be of any appropriate length and is therefore shown in broken sections. Intermediate the ends of housing 10 and in communication with chamber 12 there is provided a fluid passageway 42 having a valve 44 therein. Also intermediate the ends of housing 10 and externally thereof are provided a plurality of heat transfer fins 46. It is contemplated that housing 10 define a half wave length resonant chamber and therefore it is resonant at a basic frequency for which its length is equal to one-half of the wave length equal to the velocity of sound of the fluid therein divided by the resonant frequency. It should be appreciated also that the exact frequency of resonance will depend to a lesser degree upon the variation in cross-sectional area along the length of the tube and the amplitude of the wave present. Chamber 12, thus, is a half wave resonant section with closed ends, and as such, zones of maximum pressure variation, or pressure antinodes, will occur at each end, adjacent the respective valves. A zone of maximum velocity variation, or a velocity antinode will occur equidistant from the out of phase zones of maximum pressure variation, at the middle of the housing where fluid passageway 42 is disposed.

Since the chamber 12 is tapered, the relative intensity or amplitude of the pressure variations at either end will depend directly on the reciprocal of the diameter at that end. The wave transformation characteristics of this horn-like chamber are such as to provide for a greater amplitude of maximum pressure variations at the smaller diameter end, and a smaller amplitude of maximum pressure variations at the larger diameter end, because of the relatively larger volume thereat. These pressure variations are illustrated in FIGURE 2, wherein $P_2$ represents the pressure variations of the wave at the large end of the chamber 12, with respect to time, $P_4$ represents the variations in pressure at the small end, and $P_3$ represents the mean pressure of the entire wave within chamber 12. Although chamber 12 is shown provided with a straight taper, if desired, it may alternately be of exponential or other similar shape.

The rotational rate of shaft 36 is made equal to the frequency for which the resonant chamber 12 is a half wave length. The cams 38 and 40 are arranged with peaks 180° apart so that the valves will be open out of phase by 180°, or one-half cycle apart, and are so contoured that the valves will open for a duration of less than one-half cycle.

The mode of operation of this embodiment is as follows. In this mode valve 32 is closed and pump 26 operates to decrease the pressure in discharge chamber 20 to a value as indicated at $P_5$. When valve 22 opens a quantity of fluid will be discharged from the half-wave section. A rarefaction is therefore generated within chamber 12 by the opening of valve 22 and it travels the length of the section to the inlet end of the chamber, at which time the valve 16 opens, because of its timing. Due to the rarefaction at valve 16 when it opens, inlet fluid will then flow from an inlet pressure $P_1$ into the half-wave section, and since the pressure thereat will thereby be increased, the rarefaction or negative excursion will be diminished, as will the wave energy associated therewith. The then diminished rarefaction will then be reflected back to valve 22, at which time it will open. Because the discharge valve opens when the pressure $P_4$ of the fluid thereat is at and about a minimum value, or at a maximum excursion, the rarefaction is thereby enhanced, and consequently the wave energy is also enhanced. The cycle then repeats, as will be appreciated, each discharge process serving to further enhance the wave.

Due to the taper of chamber 12, and the wave transformation characteristics thereof, the discharge of a given quantity of fluid from the rarefaction when it is most intense generates a greater amount of wave energy than is consumed when the same quantity of fluid is taken in by the less intense rarefaction at the inlet valve. The excess wave energy thus derived is utilized to overcome the losses of the system, and to intake a greater volume of fluid than is discharged. That this is possible may be more easily visualized by considering the wave transformation, namely the creation of different amplitudes of pressure variation at each of the pressure antinodes in this structural embodiment by the taper of chamber 12. A net increase of volume into the system is made possible by the fact that fluid is discharged from the system at a point of high energy level, while it is taken into the system at a point of low energy level. Therefore, the decrease in wave energy due to the intaking is less than the increase in wave energy due to the discharging, and hence, by the principle of conservation of energy, a greater volume will be taken in than will be discharged. Another way to visualize this is to consider the fact that the volume within the chamber is proportional to the diameter squared, while the pressure is proportional only to the first order of diameter. Therefore, at the larger end of the chamber the increase in the volume taken in will be greater than the decrease in the pressure, and vice versa at the smaller end of the chamber, the axial length of the rarefaction always remaining constant as it travels back and forth within the chamber.

The surplus fluid taken into the system will cause the mean pressure $P_3$ within the chamber to rise. The mean pressure is, of course, the pressure within the half-wave section disregarding the pressure variations due to the standing wave, and is the pressure at the midpoint of the half-wave section adjacent fluid passageway 42 where there is essentially no pressure variation when the system is operated at its fundamental resonant frequency. The maximum mean pressure which may be obtained is determined by the difference between the inlet pressure $P_1$ and the discharge pressure $P_5$, heat transfer from the compressed fluid within the half-wave section, losses due to friction and the like, and the ratio of the end diameters.

The above described mode of operation is clearly represented in FIGURE 2. Simple harmonic wave motion at the basic frequency of the half-wave section is used for simplicity, although higher harmonics will usually be present. Operation at frequencies higher than those for which the section is resonant is also possible.

At the left in FIGURE 2 are shown the pressure conditions at the intake valve 16. Valve 16 opens between $a$ and $b$ on $P_2$, when the pressure within the half-wave section at the valve is less than the inlet pressure $P_1$ in the inlet chamber 14. Fluid will therefore flow into the half-wave section. An important provision of the present invention is the valving of fluid at and about the extreme of the pressure excursion, such as between $a$ and $b$ on $P_2$, since the efficiency of the conversion of wave energy to pressure, and of pressure to wave energy, depends substantially on this provision.

To the right in FIGURE 2 are shown the pressure conditions at the discharge valve 22. This valve opens between $c$ and $d$ on $P_4$, when the pressure within the half-wave section at the valve is at and about the extreme of the pressure excursion, but still greater than $P_5$, the pressure in the discharge chamber due to the action of pump 26. Fluid will therefore flow out of the half-wave section, or chamber 12.

The difference in the intensities or amplitudes of pressures $P_2$ and $P_4$ is due to the taper of the tube, the diameter at valve 16 being greater than the diameter at valve 22. As previously discussed, the removal of fluid between $c$ and $d$ on $P_4$ generates wave energy in excess of the amount necessary to intake the same quantity of fluid between $a$ and $b$ on $P_2$.

In this mode of operation, utilizing the apparatus in FIGURE 1 and a pump to initiate and maintain the system in operation, there are a number of ways in which useful work can be done by the excess wave energy created in the operating system. Generally, this mode will operate as a pressure-volume converter, and may be used in a first application as a fluid compressor. In this application, the excess wave energy will be utilized to intake a larger volume of fluid into the system than is discharged, thus, raising the mean pressure $P_3$ within the system. Fluid at the mean pressure, which is higher than the inlet pressure $P_1$, may then be withdrawn from the system through fluid passageway 42 by opening valve 44. The volume thus available at the relatively high mean pressure $P_3$ for performing useful work will be proportional to the excess amount of energy which is created. In this application fins 46 are not necessary.

Alternately, valve 44 may be closed, and the excess wave energy, and the pressure rise associated therewith, may be utilized to generate heat within the fluid within the half-wave chamber. In this application the apparatus may serve as a heat pump, wherein heat may be removed from heat transfer fins 46. The removal of heat from the system will serve to make the fluid discharged from the system at pump 26 colder than it was when taken into the system. Therefore, the cooler air discharged from pump 26 may be used for air conditioning or the like. The fins 46 are located adjacent the velocity antinode of the standing wave within chamber 12 since at this point the heat transfer characteristics of the wave are the greatest. However, in cases where the velocity of the fluid flowing through the system becomes sufficiently great with respect to the velocity variations at the velocity antinode, the fins may be positioned closer to the end of the chamber in the direction of the through flow, in order to utilize the optimum heat transfer characteristics of the wave.

In either of the above applications, or alternately thereto, useful work may be realized from the maintenance of the standing wave by means of a conventional transducer. In such an application the transducer will be mounted so as to be responsive to the pressure pulses existing within chamber 12, primarily at the resonant frequency, and will serve to directly convert them into electrical impulses for any suitable use.

I have found that the above described mode of operation is extremely stable in nature, since the mean pressure $P_3$ will continually fluctuate to achieve the optimum pressure conditions within the system. Thus, when too great a volume of fluid is removed from the system through valve 44, as when the mean pressure $P_3$ becomes very large, the system will adjust and $P_3$ will decrease so that less volume will be discharged through valve 44 and so that $P_2$ will continue to dip below $P_1$ to allow for the inlet of fluid into the system. Similarly, when heat is removed from the system $P_3$ will remain relatively constant and only the volume of fluid discharged from the system will contract, the necessary pressure conditions being maintained. If $P_2$ minimum should ever increase to near the value of $P_1$, $P_3$ will adjust itself by lowering, so that $P_2$ minimum will decrease sufficiently to provide for the desired inlet flow.

In addition, I have found that slightly higher pressures and/or temperatures may be obtained by locating pump 26 at the intake chamber 14 to supply fluid into the system, rather than to remove fluid by creating a suction at the outlet chamber 20. The pump is shown in the latter position, however, because in this position the analysis of operation more clearly illustrates the principles of the invention. Furthermore, I have found that by adjusting the length of discharge chamber 20 to make it into a closed resonant section approximately three-eighths wave length long, greater efficiencies may be obtained. By using chamber 20 as a resonant section in conjunction with discharge valve 22, the wave energy created in chamber 20 by the opening of the valve may be recovered and utilized by returning it to the valve in the proper phase at a somewhat reduced pressure to encourage flow through the valve, thus further enhancing the wave energy within chamber 12. Similarly, by using intake chamber 14 as a resonant section the desirable pressure conditions may be obtained and the efficiency of the system increased.

Figure 3:
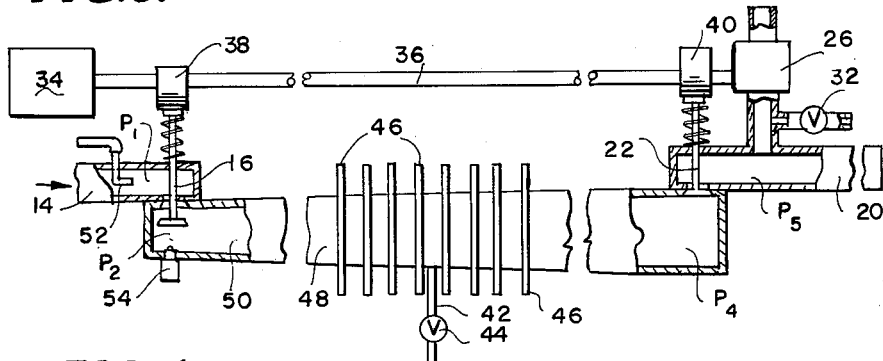
FIGURE 3 is a schematic illustration of another embodiment of an apparatus incorporating the principles of the present invention.
Figure 4:
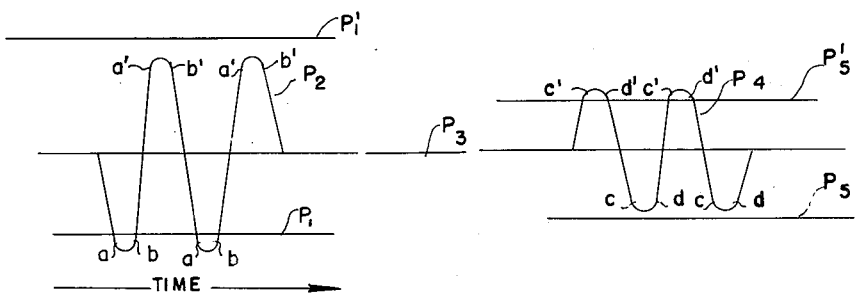
FIGURE 4 is a pressure-time curve diagramamtically illustrating the pressures within the apparatus shown in FIGURE 3.

In FIGURES 3 and 4 there is illustrated a second exemplary embodiment of an apparatus, and the pressure-time diagram therefor, having a second mode of operation as a positive mean pressure machine. This structural embodiment is almost identical to the apparatus disclosed in FIGURE 1, and therefore all like parts are designated by the same reference numerals. The primary difference in this embodiment is that the direction of taper of the resonant housing, designated at 48, is reversed so that the inlet valve 16 is at the smaller diameter end of the resonant chamber, indicated at 50, and the discharge valve 22 is at the larger end. In actual practice, the FIGURE 1 apparatus may be conveniently modified into the FIGURE 2 apparatus simply by providing the housing with a reversible tapered insert, or by using the same direction of taper and reversing the direction of flow.

The general mode of operation of the apparatus of FIGURE 3 is represented in FIGURE 4. In this mode, the wave transformation characteristic of the tapered chamber 50 serves to cause the amplitude of the pressure variations adjacent the inlet valve to be greater than the amplitude of the pressure variations adjacent the discharge valve. Generally, however, the mode of operation is very similar to the mode of operation of the apparatus shown in FIGURE 1. Thus, the intake of fluid into the system is accomplished between $a$ and $b$ when the wave Pressure $P_2$ adjacent the inlet valve is at and about an extreme pressure excursion, and is less than the inlet pressure $P_1$. The discharge of fluid from the half-wave section occurs between $a$ and $b$ at and about the time when $P_4$ is at an extreme pressure excursion, but is still greater than discharge pressure $P_5$. In this mode, the discharge of fluid serves to enhance the wave energy; however, since the discharge takes place when the wave energy is less intense than the wave energy at the point of inlet, there must be a greater volume of fluid discharged than taken in for the operation of the system to be maintained. Generally, this can be accomplished by expanding the volume of fluid taken in either by the addition of heat, or by supplementing the inlet volume by the addition of fluid into the half-wave section through valve 44 at the mean pressure $P_3$. The wave energy will be maintained so long as a sufficiently larger volume of fluid is discharged than is taken in through inlet valve 16.

In this mode of operation, utilizing the apparatus in FIGURE 3, there are a number of ways in which useful work can be performed by the operating system. Generally, this mode may operate either as a pressure-volume converter, or as an engine, or as both, and if desired the inlet and discharge chambers may be used as resonant sections, as previously discussed.

In a first application, the system may be initiated and maintained by pumping fluid into the chamber 50 at a pressure equal to $P_3$ through valve 44 and fluid passageway 42, instead of by using pump 26, which in this application can be shut off. Operating the system in this manner, useful work may be obtained in any one of several ways. If desired, the entire, relatively high volume flow through the system may be discharged through valve 32 at pressure $P_5$, which is greater than the inlet pressure $P_1$. In such a case, a relatively high volume flow, equal to the volume of fluid taken in at both valve 16 and valve 44, may be obtained. This flow may be discharged through a suitable thrust nozzle to achieve jet propulsion, or through any other suitable fluid motor.

Alternately, in this application, the system may be used as a heat pump, in which case heat may be removed from fins 46, and the thereby cooled flow through valve 32 used for air conditioning purposes. A third way in which useful work may be obtained, either in addition to or alternate to the above ways, is by utilizing a transducer responsive to the pressure pulses within chamber 50.

In a second application, the volume increase necessary to sustain this mode of operation can alternately be provided by putting heat into the system, instead of by adding fluid through valve 44. Heat may be added to the system by supplying it to the fins 46 in any conventional manner. If desired, the system may be put into operation initially by pumping fluid into the system at a pressure equal to $P_3$ through valve 44, as in the first application of this mode. The resulting machine will operate as a heat engine capable of delivering useful fluid at a relatively high pressure equal to $P_3$ through valve 44, or by delivering a higher volume flow at a lesser pressure $P_5$ through valve 32, for any suitable purpose, such as jet propulsion. In addition, useful work may be obtained by closing valve 32 and allowing the discharge flow to pass through pump 26 to operate it as a turbine or fluid engine to drive the motor 34, which in this case may operate as an electric generator to generate electricity.

In a third application, this mode may operate as an internal combustion heat engine. In this application the volume increase necessary to sustain the wave is achieved by internal combustion, which may be accomplished by supplying a quantity of fuel into the intake chamber 14, as by means of a conventional fuel injector or nozzle 52, and achieving ignition by means of a conventional glow plug or spark plug 54 disposed within chamber 50 adjacent the inlet valve 16. If this plug is of the spark type, conventional synchronization with the camshaft is desirable, particularly for starting, but is not imperative. Once the system is in operation a simple glow plug will suffice to maintain operation. The engine may be started by inputting through either valves 42 or 16 a quantity of high pressure fluid to initiate the wave motion represented in FIGURE 4. The air-fuel mixture is taken in at valve 16 between $a$ and $b$ in FIGURE 4, and combustion occurs at approximately the peak of the wave pressure $P_2$, due to the compression pressure at that point and/or the action of the ignition plug 54. Wave energy for achieving an efficient compression process is supplied by the maximum combustion pressure of the fuel-air mixture, and also by the timed discharging of fluid by valve 22 between $a$ and $b$ on $P_5$ in FIGURE 4. This discharge process is an important feature of the present invention when applied to internal combustion engines since it makes possible enhancing the wave energy, while also maintaining a high mean pressure, to thus provide a large amount of wave energy which may be utilized to obtain an efficient intaking and compression process, which in turn results in high effective compression pressures and a high thermal efficiency.

The work output of this internal combustion engine is available in the form of fluid at a relatively high pressure at valve 44, or at a lower pressure, but higher volume, at valve 32. In addition, useful work may be performed in any conventional manner by the removal of heat from fins 46, this heat being generated by both the internal combustion and the fluid friction within chamber 50.

In addition, if desired, combustion may also be accomplished at the right-hand end of chamber 50 by the provision of a fuel injector or nozzle and ignition plug in the vicinity of valve 22. In such a construction, the principle of operation will be identical to that just discussed. Combustion at one end of chamber 50 will occur one-half cycle later than the previous combustion at the other end of the chamber, and the resulting mode of operation will be different from that utilizing a single combustion process, only in that the peak pressures at both ends of the chamber will be increased to a greater value.

In any one of the three applications discussed with respect to this second mode of operation, additional work output may be obtained through the use of a conventional transducer to directly convert the wave energy into electrical energy. For example, various electrodynamic transducers, such as those of the earphone type, may be connected near a zone of maximum pressure variation to generate alternating electric current. Additionally, various piston and diaphragm transducers may be utilized in the same manner to obtain mechanical energy. Similar devices may also, of course, be used in any of the applications under the first mode of operation.

The above discussed two modes of operation of an apparatus embodying the principles of the present invention, and the various applications therefor, are simply exemplary of the many possible embodiments of the present invention which may operate as positive mean pressure systems.

Considering negative mean pressure systems, wherein the mean pressure is less than the inlet pressure, there are again an extremely large variety of possible embodiments of the present invention. However, they all have in common one feature which distinguishes them from the positive mean pressure systems. This feature is that in a negative mean pressure system the wave energy is enhanced by the expansion process which takes place at the inlet valve, and not the one at the discharge valve. Negative mean pressure systems are also characterized by the fact that both the intaking and discharging of fluid into and out of the system take place at and about a time when the pressure of the wave is at the extreme excursion in the positive direction. This is just the opposite of the operation of a positive mean pressure system, wherein both the inletting and discharging of fluid take place at a time when the wave pressure is at and about the extreme excursion in the negative direction. The two systems are similar, however, in that they both require that the same pressure and flow conditions, set forth above, be present in order to maintain operation.

A first mode of operation of a negative mean pressure system may be accomplished by the apparatus disclosed in FIGURE 1. In this mode of operation the respective pressures are represented in FIGURE 2, wherein $P_1'$ is the inlet pressure and $P_5'$ is the discharge pressure. In operation, fluid will pass into chamber 12 when $P_2$ is between $a'$ and $b'$, and in addition, below $P_1'$. This inlet process will serve to enhance the wave energy by increasing the amplitude of the pressure variations of the fluid in the zone adjacent the inlet valve, in exactly the same manner as in previous embodiments. The discharge of fluid from this mode will occur when $P_4$ is between $c'$ and $d'$. Wave energy is derived from the expansion of the fluid at inlet, and the compression due to the wave energy is utilized to expel the fluid from the resonant section at a higher pressure $P_5'$ than that at which it was taken in.

In a first application, this first mode of operation may be maintained by heat exciting the system, the pump 26 not being used. Thus, by removing heat from fins 46 the volume of fluid within chamber 12 will be contracted so that the same mass flow may be discharged from the system as is taken in. The useful output from the system when operating in this manner may be in the form of the availability of fluid at a pressure $P_5'$ which is higher than the inlet pressure $P_1'$, to be discharged through valve 32. The entire flow of fluid through the apparatus will thus be available at the pressure $P_5'$. Alternately, while still removing heat from fins 46, the system may be used as a vacuum pump, in which fluid may be drawn into the system through valve 44. In this case, the system will be capable of evacuating any region to a large negative pressure equal to $P_3$.

A second application of this mode may be achieved by pressure exciting the system. This may be done by removing fluid from valve 44, as by means of an ordinary pump, whereby the excess volume taken into the system will be removed so that the mass flow discharged will equal the mass flow taken in. Useful work may be obtained from the system in this application either by supplying a flow of fluid at a higher than inlet pressure $P_5'$, or by absorbing heat into the system by means of fins 46.

A second mode of operation of a negative mean pressure system may be accomplished by the apparatus disclosed in FIGURE 3, less the spark plug and fuel injector. In this mode, the respective pressures within the system are represented in FIGURE 4, wherein $P_1'$ is the inlet pressure and $P_5'$ is the discharge pressure. In operation, fluid will pass into chamber 50 when $P_2$ is between $a'$ and $b'$, and in addition, below $P_1'$. Just as in the previous mode, this inlet process will serve to enhance the wave energy within the system, in exactly the same manner as in previous embodiments. Discharge of fluid from this mode will occur when $P_4$ is between $c'$ and $d'$. Operation of this mode will generally be quite similar to the operation of the previous mode, both of which modes operate on the same general principles as do the positive mean pressure modes. However, in this mode the wave transformation characteristics of the tapered housing 48 will provide the wave adjacent the inlet valve with the greatest amplitude of pressure variations, just the opposite as in the previous mode. In this mode, wave energy is derived from the expansion of fluid at inlet, and the pressure differential across the system is created by external means.

In one application of this mode, the operation may be maintained by pressure exciting the system. Thus, pump 26 may be utilized to maintain the discharge pressure $P_5'$ at a lower than inlet pressure. Useful work may be obtained from the system by using it as a suction pump, whereby fluid may be drawn into the system at the low mean pressure $P_3$ through valve 44. Alternately, work may be obtained by absorbing heat, as in a refrigeration type apparatus, as by means of fins 46. In both of the negative mean pressure modes described, transducers may also be used to obtain useful work, if desired.

By combining a negative mean pressure system with a positive mean pressure system it is possible to obtain a closed flow system, in which heat may be absorbed by one system and rejected by the other system when the closed system is operating as a heat pump or heat engine. This is possible because of the converse heat characteristics which exist between positive and negative mean pressure systems. Thus, such an arrangement may be obtained by connecting the discharge of a positive system to the inlet of a negative system, and the discharge of the negative system to the inlet of the positive system. In such a closed flow system, either one or both of the valves of one of the systems may be common to the other system.

In addition to the above embodiments of the present invention, there exist many other ways by which the desired pressure conditions may be obtained. As has been discussed, these desired pressure conditions are primarily concerned with the provision of a system wherein through flow may be obtained, in addition to an enhancement of the wave energy within the system. For example, in systems using wave transformation, namely the creation of zones of maximum pressure variation of different amplitudes, the desired pressure conditions may be obtained by means other than a tapering chamber. Thus, a constant diameter chamber may be utilized in conjunction with internal combustion at one end. In such an apparatus, there would clearly exist a greater amplitude of pressure variation at one end of the chamber than at the other end. Alternately, wave transformation may be obtained in conjunction with the utilization of a transducer, or the like as a wave motor adjacent one end of the chamber, to increase the amplitude of the pressure variations thereat. Wave pressure transformation is desirable because it facilitates the achievement of greater efficiencies, however, it is by no means absolutely essential. Systems operating in the manner just described, would be governed by the same pressure and flow considerations which exist in the illustrated embodiments.

Alternately, systems may be used which do not rely at all upon wave transformation to obtain the desired pressure and flow conditions. One such system may be provided by cross-moding the operations of the embodiments shown in FIGURES 1 and 3. Thus, an operating system embodying the principles of the present invention may be established in a constant diameter chamber by utilizing a pump to decrease the discharge pressure $P_5$, and by supplying high pressure air to the resonant section through a valve similar in location to valve 44, shown in FIGURE 1.

In addition to cross-moding, there are other ways in which the desired pressure and flow conditions may be obtained without relying on wave transformation. For example, one valve may be located in a zone of maximum pressure variation, and the other valve located a short distance from the same point in either the same zone, or another zone of equal variation. The valve located a short distance from the zone of maximum variation will still be at a point of substantial variation, but the variation will be of less amplitude than exists at the point where the other valve is located. The resulting pressure conditions at the valves will be very similar to those existing when wave transformation is utilized, the system differing only in that no attempt is made to differ the amplitudes of the zones of maximum pressure variation, nor of locating both valves at the points of maximum variation.

In FIGURES 5 through 8 there are schematically represented various other resonant enclosures suitable for use with the present invention. In all of the figures the symbol A denotes a position within the enclosure wherein there exist maximum pressure variations, and symbol B denotes a position wherein the pressure variations are of lesser amplitude. Positions A and B are suitable for the location of valves to achieve desired pressure conditions. For example, the valve at A, where the pressure variations are greatest, may be equivalent to discharge valve 22 in the FIGURE 1 mode of operation, or to inlet valve 16 in the FIGURE 3 mode.

Figure 5:
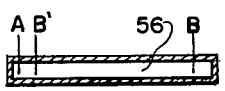
FIGURES 5 through 8 are schematic illustrations of other embodiments of the present invention.

In FIGURE 5 there is illustrated a cylindrical tubular section 56. Section 56 may be a one-half wave resonant section, in which case pressure antinodes, or zones of maximum pressure variation, will occur at the ends of the section. Accordingly, since A is located closer to one end of the section than B is to the other end, the pressure variations at B will be of a lesser amplitude than those at A. If desired, the valve at B may be located in the same zone as the valve at A, in which case its position is indicated by B'. B' and B are the same distance from the respective ends of the section, and therefore are at points of equal pressure variation.

Figure 6:
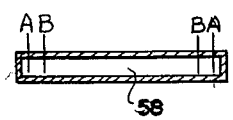

In FIGURE 6 there is illustrated a one-half wave resonant section 58 wherein two sets of valves are utilized. One valve of each set is located at a point of maximum pressure variation, as at A, and the other valve of each set is located at a point of lesser pressure variation, as at B. This arrangement is particularly suited for internal combustion engine applications, since high peak pressure waves generated at either end aid compression and combustion at the other end.

Figure 7:
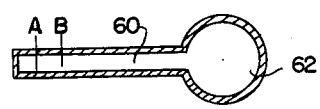

In FIGURE 7 there is illustrated a one-fourth wave resonant section 60 connected to a large volume 62. If this volume is sufficiently large relative to the wave length of the section, it will act to contain the mean pressure within the one-fourth wave section. Suitable positions for the valves, wherein there exist pressure variations of different amplitudes, are denoted by A and B.

Figure 8:
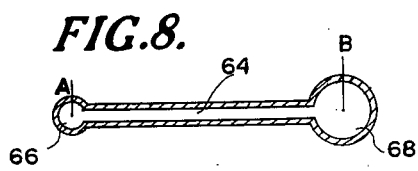

In FIGURE 8 there is illustrated an adaptation of the classical Helmholtz resonator to the present invention. This embodiment comprises a resonator section 64 having a relatively small volume 66 at one end thereof, and a larger volume 68 at the other end thereof. Zones of maximum pressure variation will occur in each of the volumes, but the pressure variations are the greatest in the smaller volume 66, the principle involved being analogous to the wave transformation characteristics of a tapered section. This type of resonator is particularly suited for applications wherein high volume flow is desired, however, the use of pressure variations of too great a magnitude will result in large wave energy losses within the system, due primarily to the high velocities which will be necessary in section 64 to sustain these pressures.

Similar results may be obtained by varying the timing of the opening of the valves, relative to the wave pressure thereat. For example, in FIGURE 1 this may be accomplished by positioning either valve 16 or valve 22 somewhat farther from its respective end of the chamber, but less than one-fourth wave length therefrom. This would, in effect, change the timing of the valve with respect to the wave pressures. Alternately, or in addition, the same result may be obtained by operating shaft 36 at a slightly higher or lower frequency than the frequency for which the section is exactly one-half wave length. Another way to obtain this result is by directly changing the timing of either of the valves with respect to the wave pressures, or by changing the duration during which either of the valves is open.

Figure 9:
FIGURE 9 illustrates a modified type of valve which may be used in any apparatus embodying the principles of the present invention.
Figure 10:
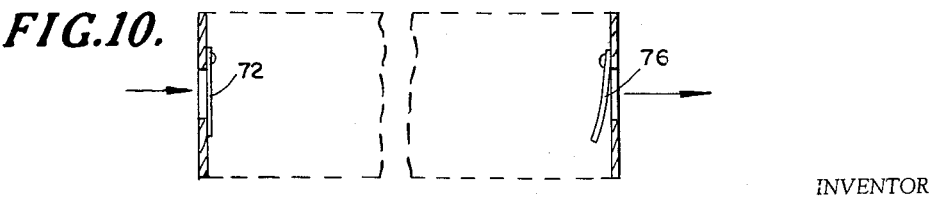
FIGURE 10 illustrates another modified type of valve which may be used in any embodiment of the present invention.

While in FIGURES 1 and 3 the valves illustrated are of the driven poppet-type, various other types of valves may be utilized. For example, other types of driven valves, such as rotary and sliding valves may be used, or if desired, pressure responsive valves are also suitable. In FIGURES 9 and 10 are illustrated two modified types of valves which are very well suited for application to the present invention. Thus, inlet valve 16 shown in FIGURES 1 and 3 may be replaced by a conventional check valve, the movable mass of which should generally be sufficiently small so as to permit quick response to the pressure differences across the valve at the wave frequency.

In FIGURES 9 and 10 there are shown a poppet-type check valve 70, and a reed-type check valve 72, respectively. These pressure responsive valves are suitable for use in the present invention, as for replacement of the driven poppet valve 16. The spring force tending to maintain these valves in a seated position, should be relatively small so as to allow quick response, but should be sufficient to prevent an undesired backflow through the valve in the reverse direction. Although small mass valves are particularly suitable, if desired, relatively massive check valves, such as those conventional in the sound art, may be used. These valves, because of their large mass, act in response to the pressure difference across the valve so slowly that they operate almost 180° out of phase with the wave pressure. In some applications it may be desirable to use valves which will open against the wave pressure, for which applications these valves would be particularly suited.

To the right in FIGURES 9 and 10 are shown pressure responsive valves 74 and 76, respectively, suitable for replacing the discharge valve 22 shown in FIGURES 1 and 3. Discharge valves 74 and 76 are generally similar in construction to inlet valves 70 and 72, respectively; however, they differ therefrom in that they are held normally open by the spring action, rather than normally closed. Thus, they will not close until the pressure difference across them becomes sufficiently great to overcome the spring tension. Flow through pressure responsive discharge valves 74 and 76, when operating in the present invention, is reversed from that of their corresponding inlet valves. Their action, while basically similar to that of a check valve, is such to check or prohibit flow only when a sufficiently large pressure differential is present. The operation of these valves may be readily understood by considering FIGURES 2 and 4, with respect to the relationship between $P_4$ and $P_5$. Since discharge valve 22 opens between $c$ and $d$ on $P_4$ when the difference is least with respect to $P_5$, and is closed when the pressure difference is large, valves 74 and 76 will serve as suitable replacements therefor because they also will permit flow only when the pressure differential is less than a minimum value, as determined by the spring tension.

The above discussion of the use of valves 70, 72, 74 and 76 is primarily directed to applications in positive means pressure systems. These valves, however, are also suitable for application in negative mean pressure systems, but since the pressure characteristics thereof are converse to those in positive systems, it will be necessary to reverse the respective positions of the valves. Thus, in a negative mean pressure system valves 74 and 76 will be used as inlet valves, and valves 70 and 72 will be used as discharge valves, the direction of flow through the valves being the same as previously described. In any application of these pressure responsive valves, it will be the biased open valve which will be most dominant in establishing the wave initially. Thus, a flow across either valve 74 or 76 will cause it to start fluttering when the pressure differential thereacross becomes sufficiently great, to initiate the wave.

In utilizing pressure responsive valves, the exact time of their opening relative to the wave within the resonant enclosure can be varied slightly, if desired, by utilizing the respective intake and discharge chambers associated with them as resonant sections. This variation in the timing will occur because the pressure wave generated in the associated resonant section will, by properly adjusting the length of the section, be returned to the valve in the proper phase relative to the phase of the wave within the resonant enclosure, to slightly speed up or slow down the time of valve opening. The change in timing obtained by adjusting the lengths of the respective inlet and discharge chambers may tend to slightly vary the wave frequency in the resonant enclosure, in which case the desired pressure conditions throughout the system may possibly be obtained solely by properly adjusting the lengths of sections associated with the valves.

In conclusion, it should be realized that any practical embodiment of a machine utilizing the principles of the present invention will most likely incorporate a combination of many features of all the exemplary embodiments disclosed herein. The many design considerations and structural modifications set forth above are not intended to have separate importance on their own, but are all intended to be considered together when designing any embodiment of the invention.

Furthermore, in summarizing, it should be noted that the desired pressure and flow conditions set forth above, are common to all embodiments of the invention. The various embodiments and modifications disclosed are for purposes of illustrating practical ways to achieve the desired pressure and flow conditions. In all embodiments there must be provided an inlet valve at a zone of substantial pressure variation, whereat the pressure of the wave at some time is less than the inlet pressure. Furthermore, there must be provided a discharge valve in a zone of substantial pressure variation, whereat at some time the pressure is greater than the discharge pressure. These two pressure conditions are essential to achieve a flow of fluid through the system. In addition, at least one of the valves must open at such a time that the expansion of fluid thereacross will serve to enhance the energy of the wave at that point. This expansion process takes place either into the resonant enclosure, when and where the wave pressure is at and about an extreme excursion in the positive direction, or out of the resonant enclosure, when and where the wave pressure is at and about an extreme excursion in the negative direction, the former existing in a negative mean pressure system, and the latter in a positive mean pressure system. Regardless of the system used, as will be apparent from FIGURES 2 and 4, if inlet is obtained when the wave pressure thereat is at a positive excursion, discharge will occur when the wave pressure at discharge is also at an excursion in the same positive direction. Similarly, when pressure is inlet when the wave pressure thereat is at a negative excursion, fluid will be discharged when the wave pressure at discharge is also at a negative excursion.

Thus, there is disclosed in the above description, and in the drawings, a number of exemplary embodiments of my invention which fully and effectively accomplish the objects of the invention. However, it will be understood by those skilled in the art that the specific details of construction and arrangement of parts, as described, are by way of example only and are not to be construed as limiting the scope of the invention. I, therefore, do not wish to be limited to the precise details set forth, and intend that the invention embody all such features and modifications as are within the scope of the appended claims.

Having thus described my invention, what I claim as new and desire to secure by Letters Patent is:

1. Apparatus for performing a thermodynamic cycle therein comprising: housing means defining a resonator chamber; means for providing a standing wave in an elastic fluid disposed within said chamber; inletting means on said housing adjacent a zone of substantial pressure variation within said chamber for inletting fluid at a given pressure into said chamber when the pressure in said zone is less than said inlet pressure; discharge means on said housing for discharging fluid from a zone of substantial pressure variation within said chamber when the pressure thereat is at and about a point of maximum excursion from the mean pressure of said standing wave; and means for extracting useful work from said apparatus, the arrangement being such that said inletting means inlets fluid into said chamber when the pressure in said zone is at and about a point of maximum excursion in a given direction from the mean pressure of said standing wave, and wherein said discharge means discharges fluid when the pressure thereof is at and about a point of maximum excursion in the same said given direction from the mean pressure of said standing wave.

2. Method for accomplishing a thermodynamic cycle comprising the steps of: providing a standing wave in a volume of elastic fluid; adding fluid at a given pressure to said volume at a time when the pressure of said wave at the point of addition is less than said inlet pressure; removing fluid from said volume at a time when the pressure of said wave at the point of removal is at and about a point of maximum excursion from the mean pressure of said standing wave; and extracting useful work from said cycle, the fluid being added to said volume when the pressure of said wave at the point of addition is at and about a point of maximum excursion in a given direction from the mean pressure of said wave, and wherein fluid is removed from said volume from a point of maximum excursion in the same said direction from the mean pressure.

3. Apparatus for performing a thermodynamic cycle therein comprising: housing means defining a resonator chamber; means for providing a standing wave in an elastic fluid within said chamber; inletting means for introducing at selected times inlet fluid under a given pressure into said chamber; discharge means for discharging fluid at selected times from said chamber; means for operating said inletting means to inlet fluid at and about the time period when the pressure of the fluid in the chamber in the region of said inletting means makes its closest approach to said inlet pressure in a given direction of excursion from the mean pressure within said chamber; means for operating said discharge means to discharge fluid from said chamber at and about the time period when the pressure in said chamber in the region of said discharge means is at a point of maximum excursion from the mean pressure within said chamber in the same said given direction; and means for extracting useful work from said apparatus.

4. Apparatus for performing a thermodynamic cycle therein comprising: housing means defining a resonator chamber; means for providing a standing wave in an elastic fluid disposed within said chamber; inletting means for introducing at selected times inlet fluid under a given pressure into said chamber; discharge means for discharging fluid at selected times from said chamber; means for operating said inletting means to inlet fluid at and about the time period when the pressure of the fluid in said chamber in the region of said inletting means is at a maximum excursion in a given direction from the mean pressure of said standing wave; means for operating said discharge means to discharge fluid from said chamber at and about the time period when the fluid in said chamber in the region of said discharge means is at a maximum excursion in the same said given direction from the mean pressure of said standing wave; and means for extracting useful work from said apparatus.

5. Apparatus for performing a thermodynamic cycle therein comprising: housing means defining a resonator chamber; means for providing a standing wave in an elastic fluid medium disposed within said chamber; inlet valve means on said housing adjacent a zone of substantial pressure variation therein for inletting fluid at a given pressure into said chamber when the pressure therein at said inlet valve is less than said inlet pressure and is at and about a point of maximum pressure excursion in a given direction from the mean pressure of said standing wave; discharge valve means on said housing adjacent a zone of substantial pressure variation therein for discharging fluid from said chamber when the pressure therein at said discharge valve is at and about a point of maximum pressure excursion in said same given direction from the mean pressure of said standing wave; and means for extracting useful work from said apparatus.

6. Apparatus as claimed in claim 5, wherein said inlet valve means opens when the pressure thereat within said chamber is at and about a point of minimum pressure, and where said discharge valve means opens when the pressure thereat within said chamber is also at and about a point of minimum pressure.

7. Apparatus as claimed in claim 6, further comprising means associated with said chamber for causing the amplitude of the pressure variations within said chamber to be greater at one of said valve means than at the other.

8. Apparatus as claimed in claim 7, wherein the pressure variations within said chamber at said discharge valve means are of greater amplitude than those at said inlet valve means.

9. Apparatus as claimed in claim 7, wherein the pressure variations within said chamber at said inlet valve means are of greater amplitude than those at said discharge valve means.

10. Apparatus as claimed in claim 5, wherein said inlet valve means opens when the pressure thereat within said chamber is at and about a point of maximum pressure, and wherein said discharge valve means opens when the pressure thereat within said chamber is also at and about a point of maximum pressure.

11. Apparatus as claimed in claim 10, further comprising means associated with said chamber for causing the amplitude of the pressure variations within said chamber to be greater at one of said valve means than at the other.

12. Apparatus as claimed in claim 11, wherein the pressure variations within said chamber at said discharge valve means are of greater amplitude than those at said inlet valve means.

13. Apparatus as claimed in claim 11, wherein the pressure variations within said chamber at said inlet valve means are of greater amplitude than those at said discharge valve means.

14. Apparatus as claimed in claim 5, further comprising means associated with said chamber for causing the amplitude of the pressure variations within said chamber to be greater at one of said valve means than at the other.

15. Apparatus as claimed in claim 5, further comprising operating means for opening both of said valve means at predetermined timed intervals.

16. Apparatus as claimed in claim 5, wherein both of said valve means are pressure responsive valves.

17. Apparatus as claimed in claim 5, wherein said inlet valve means opens when the pressure thereat within said chamber is less than the mean pressure of said standing wave, and wherein said discharge valve means opens when the pressure thereat within said chamber is also less than the mean pressure of said standing wave.

18. Apparatus for performing a thermodynamic cycle therein comprising: housing means defining a resonator chamber; means for providing a standing wave in an elastic fluid medium disposed within said chamber; inletting means on said housing adjacent a first zone of substantial pressure variation within said chamber for inletting fluid at a given pressure into said chamber when the pressure in said zone is less than said inlet pressure; discharge means on said housing adjacent a second zone of substantial pressure variation within said chamber for discharging fluid therefrom when the pressure thereat is at and about a point of maximum excursion from the mean pressure of said standing wave; means for causing the amplitude of pressure variation at one of said zones to be greater than the amplitude of pressure variation at the other of said zones; and means for extracting useful work from said apparatus the arrangement being such that said discharge means discharges fluid from said second zone when the pressure thereat is less than the mean pressure of said standing wave.

19. Apparatus for performing a thermodynamic cycle therein comprising: housing means defining a resonator chamber; means for providing a standing wave in an elastic fluid medium disposed within said chamber, whereby at least two pressure antinodes and at least one pressure node are created at spaced apart points within said chamber; means for causing the amplitude of pressure variation at one of said antinodes to be greater than the amplitude of pressure variation at the other of said antinodes; inlet means for introducing inlet fluid at a given pressure into said chamber at one of said antinodes when the pressure of the fluid thereat is less than the pressure of said inlet fluid; discharge means providing for the discharge of fluid at another of said antinodes from said chamber when the pressure of the fluid thereat is at and about a point of maximum excursion from the mean pressure of said standing wave; and means for extracting useful work from said apparatus, the arrangement being such that said inlet means inlets fluid into said chamber when the pressure thereat within said chamber is at and about a point of maximum excursion in a given direction from the mean pressure of said standing wave, and wherein said discharge means discharges fluid when the pressure thereat is at and about a point of maximum excursion in the same said given direction from the mean pressure of said standing wave.

References Cited in the file of this patent

FOREIGN PATENTS

| 2,209 | Great Britain | Jan. 31, 1908 |
| 424,955 | Great Britain | Dec. 1, 1933 |
| 583,542 | Great Britain | Dec. 20, 1946 |